United States Patent
Dudar et al.

(10) Patent No.: US 10,358,998 B2
(45) Date of Patent: Jul. 23, 2019

(54) METHOD AND SYSTEM FOR A HUMIDITY SENSOR IN A VEHICLE

(71) Applicant: Ford Global Technologies, LLC, Dearborn, MI (US)

(72) Inventors: Aed M. Dudar, Canton, MI (US); Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 15/474,386

(22) Filed: Mar. 30, 2017

(65) Prior Publication Data

US 2018/0283307 A1 Oct. 4, 2018

(51) Int. Cl.
| | |
|---|---|
| *F02D 41/22* | (2006.01) |
| *F02M 25/022* | (2006.01) |
| *F02M 25/028* | (2006.01) |
| *F02M 26/46* | (2016.01) |
| *F02M 26/49* | (2016.01) |
| *B60H 1/32* | (2006.01) |
| *F02M 26/22* | (2016.01) |
| *F02B 29/04* | (2006.01) |

(52) U.S. Cl.
CPC ....... *F02D 41/222* (2013.01); *B60H 1/32331* (2019.05); *F02M 25/028* (2013.01); *F02M 25/0225* (2013.01); *F02M 25/0227* (2013.01); *F02M 26/46* (2016.02); *F02M 26/49* (2016.02); *F02B 29/04* (2013.01); *F02D 2200/0418* (2013.01); *F02M 26/22* (2016.02); *Y02T 10/40* (2013.01)

(58) Field of Classification Search
CPC .................................................... F02D 41/222
See application file for complete search history.

(56) References Cited

U.S. PATENT DOCUMENTS

| | | |
|---|---|---|
| 9,074,548 B2 | 6/2015 | Surnilla et al. |
| 9,224,252 B1 | 12/2015 | Guo et al. |
| (Continued) | | |

OTHER PUBLICATIONS https://media.ford.com/content/fordmedia/fna/us/en/news/2016/09/20/ford-employees-record-inventions-2016.html, "Ford Employees on Pace to Set Record for Inventions in 2016", Dearborn, MI, Sep. 20, 2016, 4 pages.

*Primary Examiner* — Imran K Mustafa
(74) *Attorney, Agent, or Firm* — Brooks Kushman P.C.; Julia Voutyras

(57) ABSTRACT

A vehicle includes an engine air intake having a humidity sensor, and a system having a nozzle positioned in the air intake and fluidly connected to a reservoir. The vehicle has a controller configured to activate the system to deliver fluid from the nozzle into the intake while the engine is inoperative and generate a diagnostic code in response to a change in humidity measured by the sensor being less than a threshold value. A method of controlling a vehicle includes measuring a baseline humidity (H1) using a humidity sensor in an air intake of an engine, and controlling a misting system to mist fluid from a reservoir into the air intake and adjacent to the humidity sensor while the engine is inoperative. The method measures a post-fluid delivery humidity (H2) using the humidity sensor, and generates a diagnostic code based on a comparison of H1 and H2.

15 Claims, 3 Drawing Sheets

(56) References Cited

U.S. PATENT DOCUMENTS

| | | | |
|---|---|---|---|
| 2003/0041897 A1* | 3/2003 | Lee | B60S 1/481 137/59 |
| 2009/0254245 A1* | 10/2009 | Bauerle | F02D 41/222 701/29.2 |
| 2014/0238348 A1* | 8/2014 | Pursifull | F02M 25/0221 123/434 |
| 2014/0316676 A1 | 10/2014 | Pursifull et al. | |
| 2016/0083936 A1 | 3/2016 | Martin et al. | |

* cited by examiner

METHOD AND SYSTEM FOR A HUMIDITY SENSOR IN A VEHICLE

TECHNICAL FIELD

Various embodiments relate to a system and method for diagnosing a humidity sensor in a vehicle.

BACKGROUND

Engines may utilize humidity sensors at various locations for controlling engine operation, such as for controlling spark timing and exhaust gas recirculation (EGR). Errors in the humidity reading can lead to improper spark timing, and thus knock, as well as various other issues with regard to condensate formation, EGR control, diluent control, etc.

Often, a diagnostic is run to check the functionality or rationality of an engine humidity sensor, and this diagnostic may use a comparison of the humidity sensor output with a humidity as estimated from signals from an exhaust gas oxygen sensor, pressure sensors, temperature sensors and the like, or with a humidity as measured using a second humidity sensor in another location in the engine system. Issues may arise with this technique if the humidity between the two sensor locations is different, as is often the case between an intake and an exhaust system during engine operation, or differences may arise due to other noise factors such as completeness of combustion, exhaust gas temperature, and the like. Additionally, for vehicles such as hybrids the engine may have limited operating time, and the conventional diagnostics may therefore have limited opportunities to be conducted. Furthermore, in arid climates with little or no humidity in the ambient air, it may be difficult to test or diagnose the sensor.

SUMMARY

In an embodiment, a vehicle is provided with an air intake for an engine having a humidity sensor, and a system having a nozzle fluidly connected to a reservoir, with the nozzle positioned in the air intake. The vehicle has a controller configured to activate the system to deliver fluid from the nozzle into the intake while the engine is inoperative and generate a diagnostic code in response to a change in humidity measured by the sensor being less than a threshold value.

In another embodiment, a method of controlling a vehicle is provided. A baseline humidity (H1) is measured using a humidity sensor in an air intake of an engine. A misting system is controlled to mist fluid from a reservoir into the air intake and adjacent to the humidity sensor while the engine is inoperative. A post-fluid delivery humidity (H2) is measured using the humidity sensor. A diagnostic code is generated based on a comparison of H1 and H2.

Various embodiments have associated non-limiting advantages. For example, the present disclosure provides for a vehicle that implements a method for diagnosing a humidity sensor without having to cross check its output against other sensors or relying on an engine combustion time. The humidity sensor may be diagnosed or rationalized during a vehicle-off and/or engine-off condition when an onboard reservoir contains or has collected some water, for example water from a heat exchanger that would otherwise drip to the outside of the vehicle. The method may be provided as an opportunistic method that waits until the vehicle air conditioning has been operated, which is typical in hot and dry climates. If the signal from the humidity sensor has not varied such that it may be unresponsive or have a sensing error, the control system runs the diagnostic method when there is sufficient water in the reservoir to run the test. During an idle stop condition (S/S), or an EV electric mode drive (HEV), or right after vehicle key on or key off when engine is not combusting and is inoperative, the control system activates the water system to disperse or mist water into the intake manifold and excite the humidity sensor. The test is generally conducted at engine off, to reduce the effect on the combustion process, e.g. by preventing the cylinders from inhaling extra water mist and possible misfires. If the humidity sensor responds as expected to the mist, then the controller determines that humidity sensor is working properly. If the sensor does not respond as expected, then the controller may set a flag or other diagnostic code such that the sensor is examined further.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present disclosure.

Figure 1:
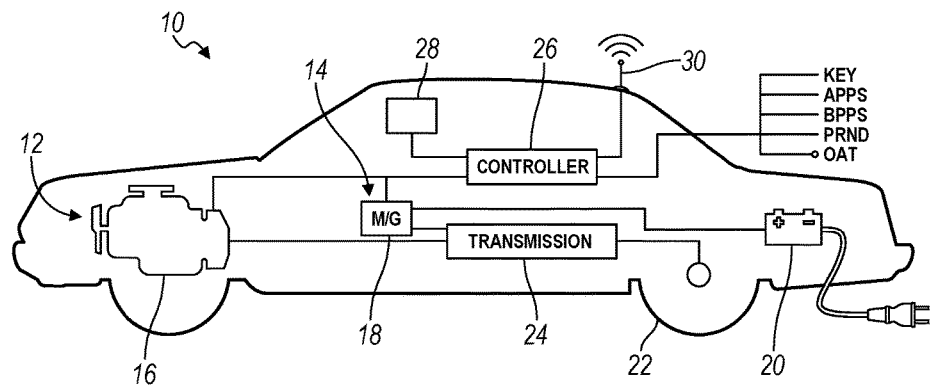
FIG. 1 illustrates a vehicle according to an embodiment.

FIG. 1 illustrates a schematic of a vehicle 10. The vehicle 10 has one or more power sources to propel the vehicle. The vehicle has a first power source 12 and a second power source 14 connected to the driveline. The first power source 12 is provided by an internal combustion engine 16. The second power source 14 may be provided by one or more electric machines 18, such as an electric motor/generator that is connected to a traction battery 20, such as a high voltage traction battery. In one embodiment, the vehicle 10 only has the first power source 12, and is provided as a conventionally powered vehicle, or as a start-stop or other powertrain with the sole power source being an engine. In other embodiments, the vehicle 10 has both power sources 12, 14 and is configured as a hybrid electric vehicle (HEV), with the powertrain arranged as a parallel, series, or other powertrain architecture. In further embodiment, the HEV may be provided as a plug-in electric vehicle such that the traction battery may be charged using power from an external power source, e.g. the electric grid, via a charging plug.

The power sources 12, 14 are connected to vehicle wheels 22 via the driveline 24, which may incorporate a transmission such as a step ratio gearbox, continuously variable transmission, planetary gearset, or the like.

The vehicle 10 has a control system 26, also referred to herein as a controller 26. The control system 26 may include any number of controllers, and may be integrated into a single controller, or have various modules. Some or all of the controllers may be connected by a controller area network (CAN) or other system. The control system 26 may be connected to a random access memory or another data storage system. In some embodiments, the vehicle has a user interface 28 including a display system in communication with the control system 26. The user interface 28 may include an on-board vehicle system, and may also include a receiver configured to receive information and inputs from a remote user using a cellular phone, a computer, or the like. The user interface 28 may also include a navigation system.

The control system 26 is in communication and is configured to control the first and second power sources 12, 14, the battery 20, and the transmission 24, and other vehicle systems as described below. The control system 26 is also configured to receive signals from these vehicle components related to their status and the vehicle state.

The control system 26 has a receiver 30, which may include one or more antennae. Each antenna may be configured to wirelessly receive signals from various sources, including, but not limited to, cellular towers, satellites, wireless network servers, other vehicles as vehicle-to-vehicle (V2V) communications, vehicle-to-infrastructure (V2X) communications, and the like. The receiver 30 may also be configured as or provided with a transmitter to send signals regarding vehicle state or other information.

The control system 26 additionally receives operator or driver inputs to the vehicle 10. These operator inputs include a key input, an accelerator pedal position as sensed by an accelerator pedal position sensor (APPS), a brake pedal position as sensed by a brake pedal position sensor (BPPS), a gear shift selector (PRND), an emergency brake pedal, switch, or lever, and others. The control system 26 is also connected to an outside air temperature (OAT) sensor to measure the temperature of the ambient or surrounding environment. The key input is based on a key cycle or drive cycle and is traditionally provided by the insertion of an ignition key into the vehicle, where turning the key to an "on" position starts the vehicle and a drive cycle, and turning the key to an "off" position ends the drive cycle. The key input may additionally be provided by a smart key or other electronic access system or device for "keyless" start and end of the drive cycle.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 2:
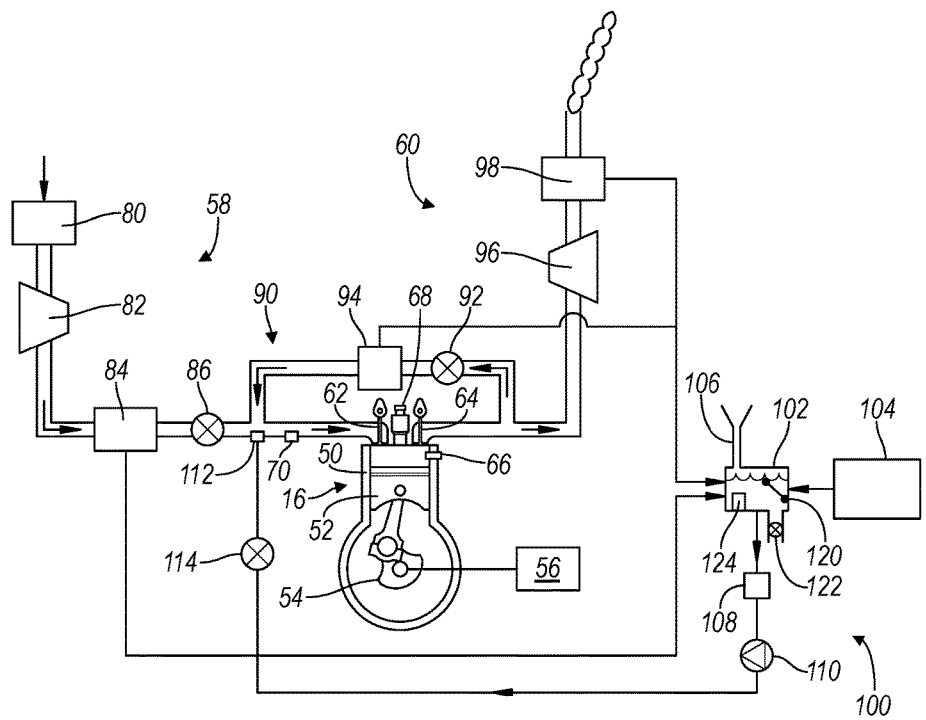
FIG. 2 illustrates vehicle systems for the vehicle of FIG. 1 according to an embodiment.

FIG. 2 illustrate a schematic of various vehicle systems for vehicle 10. The engine 16 is illustrated schematically in FIG. 2 with one cylinder 50, although any number of cylinders is contemplated. The cylinder 50 and an associated piston 52 define a combustion chamber. The piston 52 is connected to a crankshaft 54 to convert linear movement of the piston to rotary motion of the crankshaft. The crankshaft 54 is connected to the vehicle driveline as described above. The crankshaft may be rotated using an electric machine 56. The electric machine may be a separate starter motor dedicated for use with the engine 16, or may be an electric machine in power source 14 as described above with respect to FIG. 1.

The cylinder 50 is in fluid communication with an intake system 58 and an exhaust system 60. An intake valve 62 controls flow from the intake system 58 into the cylinder 50. An exhaust valve 64 controls flow from the cylinder 50 to the exhaust system 60. The intake and exhaust valves 62, 64 may be operated in various ways as is known in the art to control the engine operation.

A fuel injector 66 delivers fuel from a fuel system directly into the cylinder 50 such that the engine is a direct injection engine. A low pressure or high pressure fuel injection system may be used with the engine 16, or a port injection system may be used in other examples. The ignition system includes a spark plug 68 that is controlled to provide energy in the form of a spark to ignite a fuel air mixture in the cylinder 50. In other embodiments, other fuel delivery systems and ignition systems or techniques may be used, including compression ignition.

The engine 16 includes a controller incorporated into control system 26 and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 60, an engine coolant temperature, an accelerator pedal position sensor, an engine manifold pressure (MAP sensor), an engine position sensor for crankshaft position, an air mass sensor in the intake manifold 58, a throttle position sensor, and the like. The engine 16 also includes a humidity sensor 70 positioned in the intake system 58, as described below.

The engine 16 may operate under a four-stroke cycle including an intake stroke, a compression stroke, an ignition stroke, and an exhaust stroke. In other examples, the engine 16 may operate as a two-stroke cycle. During the intake stroke, the intake valve 62 opens and the exhaust valve 64 closes while the piston 52 moves from the top of the cylinder 50 to the bottom of the cylinder to introduce air from the intake manifold to the combustion chamber. The piston 52 position at the top of the cylinder 50 is generally known as top dead center (TDC). The piston 52 position at the bottom of the cylinder is generally known as bottom dead center (BDC).

During the compression stroke, the intake and exhaust valves 62, 64 are closed. The piston 52 moves from the bottom towards the top of the cylinder 50 to compress the air within the combustion chamber.

Fuel is then introduced into the cylinder 50 and ignited. In the engine 16 shown, the fuel is injected into the cylinder 50 and is then ignited using spark plug 68. In other examples, the fuel may be ignited using compression ignition.

During the expansion stroke, the ignited fuel air mixture in the cylinder 50 expands, thereby causing the piston 52 to move from the top of the cylinder 50 to the bottom of the cylinder. The movement of the piston 52 causes a corresponding movement in crankshaft 54 and provides for a mechanical torque output from the engine 16.

During the exhaust stroke, the intake valve 62 remains closed, and the exhaust valve 64 opens. The piston 52 moves from the bottom of the cylinder to the top of the cylinder 50 to remove the exhaust gases and combustion products from the combustion chamber by reducing the volume of the chamber. The exhaust gases flow from the cylinder 50 to the exhaust system 60.

The intake and exhaust valve 42, 44 positions and timing, as well as the fuel injection timing and ignition timing may be varied for the various engine strokes.

The engine 16 may be "motored" by the electric machine 56. The electric machine 56 cranks the crankshaft such that it rotates and the control system 26 controls the intake and exhaust valves 62, 64 as described above. When the engine is being motored, it is unfueled, e.g. no fuel is delivered to the cylinders, such that no combustion occurs. During the motoring process, the engine intake and exhaust systems 58, 60 as well as the cylinder 50 have fresh outside air drawn through them. The engine may be motored when it is inoperative, or not required to propel the vehicle, for example when a start-stop vehicle is stopped, when a hybrid vehicle is operating in an electric-only mode, and the like. Furthermore, the engine may be motored during a vehicle drive cycle, or may be controlled by the control system 26 to motor after a vehicle drive cycle or key cycle ends, e.g. as part of a diagnostic test in the method as described below.

The intake system 58 provides an air flow path of intake gases to the engine 16. Outside air flows into an intake 80 with an associated air filter. In some examples, the engine 16 has charged or forced induction intake air, such that the intake air flows through a compressor such as turbine 82 for a turbocharger as shown, through a supercharger, or another similar device. The intake air then flows through a charge air cooler 84 or intercooler. The charge air cooler 84 cools the pressurized intake air using either outside air or a liquid coolant, such as in the engine coolant system. In other examples, the engine 16 may be naturally aspirated such that the engine operates without the compressor and charge air cooler.

The intake air flows through a throttle valve 86 that controls the flow rate of the air to the engine 16. In one example, the humidity sensor 70 is positioned downstream of the throttle 86 and upstream of the intake valve 62.

The exhaust system 60 contains exhaust gas from the engine 16 as provided via the exhaust valves 64. The exhaust gas from the engine 16 may follow one of several flow paths. A portion of the exhaust gas may flow through an exhaust gas recirculation (EGR) loop 90, which recirculates the exhaust gas back to the intake system 58 of the engine 16, where it mixes with fresh incoming air before entering the engine 16. The flow of the exhaust gas through the EGR loop 90 is controlled by an EGR valve 92. The EGR loop 90 may contain an EGR cooler 94, which is a heat exchanger that cools the exhaust gases before they mix with the intake gas in the intake system 58. The EGR cooler 94 may use a liquid coolant, such as engine coolant, to cool the EGR gases, or may cool the EGR gases by heat exchange with ambient air.

Alternatively, the exhaust gas flows along a second flow path. The exhaust gas may flow through a turbine 96 for an engine 16 with a turbocharger as shown. In other examples the engine 16 is supercharged or naturally aspirated such that the engine 16 is provided without a turbine 96. The exhaust gases flow through a sound and/or emissions treatment system 98 that contains devices such as a catalytic converter and one or more mufflers, and then exit to the atmosphere.

A fluid system 100, water system 100 or misting system 100 is provided on-board the vehicle 10 and is fluidly connected to the engine 16 system. The water system 100 may be provided for harvesting water or water reclamation as described in U.S. patent application Ser. No. 14/490,744, filed Sep. 19, 2014, and incorporated by reference in its entirety herein. In other examples, the water system 100 is another vehicle system that uses a liquid fluid that comprises water, for example, a windshield washing system containing a fluid mixture of water and alcohols and/or solvents, a diesel emissions fluid (DEF) system containing a fluid mixture of deionized water and urea, and the like.

The water system 100 has a reservoir 102. The reservoir 102 may be filled by the operator, as for a windshield washing system or a DEF system. In other examples as shown, the reservoir 102 may be fluidly connected to and receive condensate from various heat exchangers in the vehicle 10. The condensate comprises liquid water. For example, condensate may be provided from drains or traps in one or more of the charge air cooler 84, the EGR cooler 94, the emissions and muffler system 98, and the like. Additionally, the condensate may be provided from drains, traps, or a collection device from another vehicle system heat exchanger 104 such as an evaporator for a vehicle heating, ventilation, and air conditioning (HVAC) system. In a further embodiment, the reservoir 102 may collect liquid water from the outside environment, e.g. from rainwater, via an inlet 106.

The liquid water in the reservoir 102 may flow through a filtration device 108. The filtration device removes particulate matter, and may be provided with a separator membrane or other similar device to selectively remove chemical constituents from the liquid water.

In one example, the liquid water is pressurized by a pump 110. The pump 110 may be mechanically or electrically operated. The pressurized water flows from the pump 110 to a nozzle 112 or atomizer such that the nozzle 112 is fluidly connected to the reservoir.

The nozzle 112 is positioned within the intake system 58 and may be positioned in the same section of the intake as humidity sensor 70, or may be positive upstream of the sensor 70. In one example, as shown, the nozzle 112 is downstream of the throttle 86 and upstream of the intake valves 62 such that the nozzle is in the same section of the intake system as the humidity sensor 70. In other examples, the humidity sensor 70 and nozzle may be positioned in the EGR loop. A metering valve 114 in system 100 is positioned upstream of the nozzle 112 to deliver a controlled quantity of liquid water to the nozzle. The nozzle 112 is configured to disperse the bulk liquid into droplet form, for example, as a mist or aerosol in the intake system 58. The nozzle 112 may be selected to provide droplets with a mean diameter of less than 100 micrometers, 50 micrometers, less than 20 micrometers, less than 10 micrometers, less than 5 micrometers, or on the order of 1 micrometer or less.

In other examples, device 110 in the system 100 is contains a fan and an ultrasonic device or another misting or vaporization device such that a mist is entrained in an air flow as provided via an air input to the fan, and the misted or humidified air flow is delivered to the intake system 58 via a metering valve 114 and a port 112.

In various examples, the reservoir 102 has a fluid level gauge 120, such as a float gauge, to provide a signal to the control system 26 indicative of a level of the liquid in the reservoir. The reservoir 102 may be equipped with a drain valve 122 that is located in a sump or other low region of the reservoir 102. The drain valve 122 may be selectively operated by the control system 26 to drain the reservoir to the outside environment. The control system 26 may open the drain valve 122 in response to a signal from the fluid level gauge 120 indicating that the reservoir 102 is full and close the valve 122 when the fluid in the reservoir 102 is below another lower level, or alternatively, an overflow valve may be provided in the reservoir 102 or system 100. In one example, the control system 26 is configured to, during operation of the vehicle 10, open the drain valve 122 in response to a signal indicative of an amount of fluid in the reservoir from the fluid level sensor 120 being above a first threshold, and close the drain valve 122 in response to the signal being below a second threshold, with the second threshold being less than the first threshold.

In one example, the control system 26 monitors the outside air temperature via the OAT sensor and opens the drain valve 122 if the outside air temperature is below a threshold, e.g. 40 degrees Fahrenheit, to prevent the fluid in the reservoir from freezing. In another example, the control system 26 monitors a forecast temperature and opens the drain valve 122 if the forecasted outside air temperature is below a threshold to prevent the fluid in the reservoir 102 from freezing. In further examples, the reservoir 102 may include a heating element 124, such as a resistive heater or another device to heat the liquid in the reservoir. The control system 26 may activate the heating element 124 to heat the fluid in the reservoir in response to a measured or forecasted outside air temperature being below a temperature threshold.

The humidity sensor 70 may be configured to measure or sense relative humidity in the intake air flow, or may be configured to measure or sense absolute or specific humidity in the intake air flow. Specific or absolute humidity is a measure of the water vapor in the air, e.g. the mass of the water vapor in a mass of dry air. Relative humidity is a measure of amount of moisture in the air relative to a maximum amount that the air could contain at that temperature, e.g. the mass of the water vapor over the mass of the water vapor in saturated air, and is typically provided as a percentage.

Figure 3:
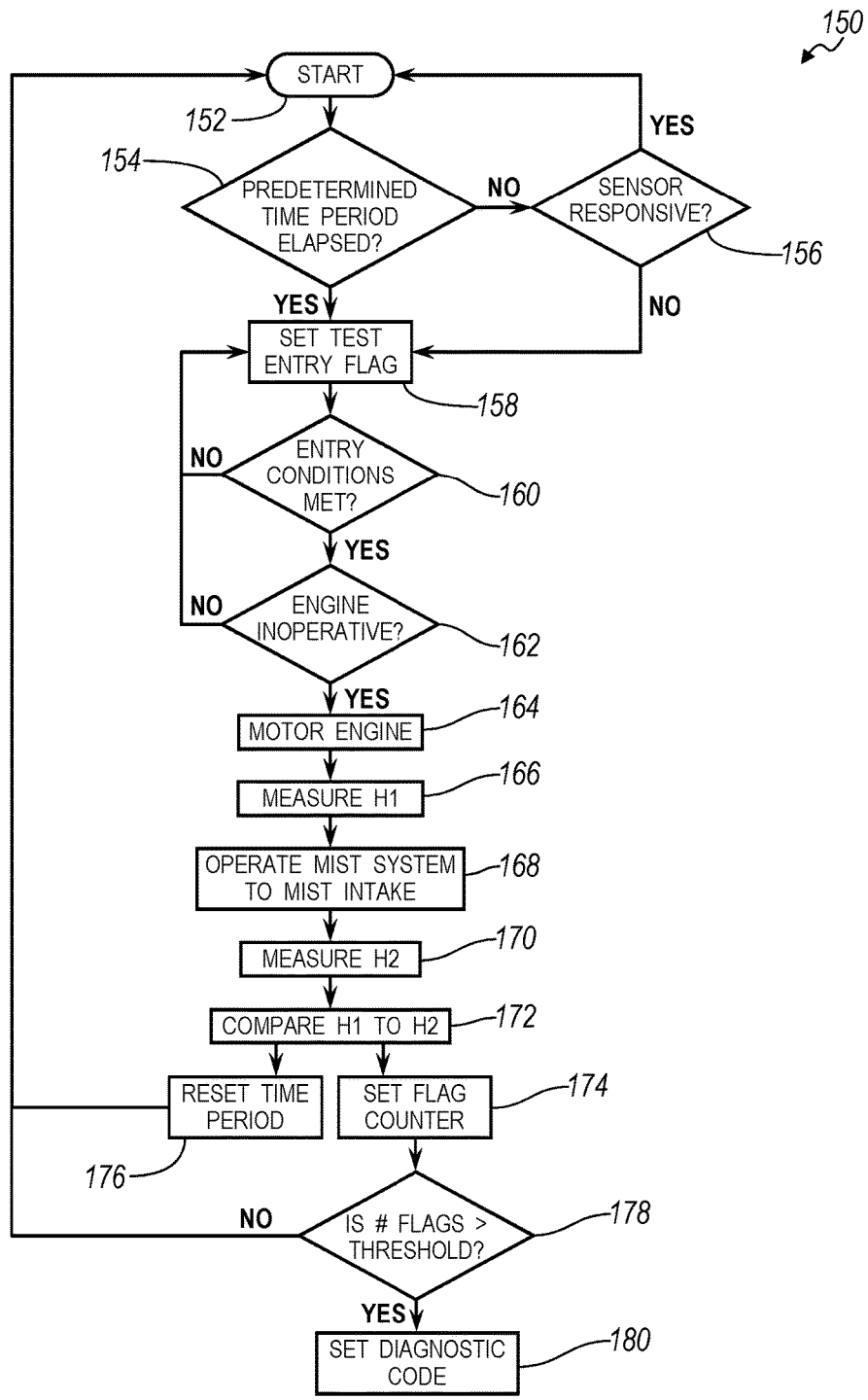
FIG. 3 illustrates a flow chart of a method of operating the vehicle according to an embodiment.

FIG. 3 illustrates a flow chart of a method 150 of operating the vehicle 10. The method may include greater or fewer steps than shown, the steps may be rearranged in another order, and various steps may be performed serially or simultaneously according to various examples of the disclosure.

At step 152, the control system 26 starts the method 150. The control system 26 proceeds to step 154 and determines if a predetermined time period has elapsed, for example, based on a timer or time since the last diagnostic test was run by the control system. If the predetermined time period has not elapsed, the method proceeds to step 156. If the predetermined time period has elapsed, the method proceeds to step 158.

At step 156, the control system 26 determines if the humidity sensor 70 is operating and functioning rationally or as expected. The control system 26 may use a variation in humidity sensor signal during a transient time period such as an engine cold start to determine if the sensor is outputting a changing humidity as expected. The control system 26 may additionally compare the humidity sensor 70 signals and measurements across a number of prior drive cycles to see if there is variability between the drive cycles and different days of operation of the vehicle. The control system 26 may additionally compare the humidity sensor 70 output and humidity reading to a humidity as provided from an outside source (H0), such as regional or local weather report or forecast from a satellite or other weather broadcast, or a humidity level as sensed by another vehicle nearby and received in a V2V communication or other vehicle-infrastructure (V2X) communications, etc. The outside humidity (H0) may be indicative of the humidity at the same location as the vehicle or for a nearby location, e.g. within a specified distance on the order of tens of miles, the nearest weather station, etc. The outside humidity (H0) may additionally be based on a weather forecast for the location of the vehicle. If the humidity reading of the sensor 70 is similar to outside measurements provided to the vehicle and/or has sufficient variability in operation, the method returns to step 152. If the control system determines that the sensor 70 may be unresponsive or not functioning as expected, the method proceeds to step 158.

At step 158, the control system 26 sets a test entry flag such that the test will be run by the vehicle at the next appropriate opportunity.

At step 160, the control system 26 determines if various entry conditions are met for running the diagnostic test of the sensor 70. The control system 26 may require some or all of the entry conditions to be met before proceeding from step 160 to step 162.

An entry condition may include the ambient temperature, e.g. outside air temperature being within a predetermined range of temperatures, e.g. 40-90 degrees Fahrenheit. Another entry condition may include an amount of fluid within the reservoir 102 as determined using the level gauge 120 being above a predetermined volume such that there is sufficient fluid for the control system 26 to proceed with the method. Another entry condition may be the humidity as measured by the sensor 70 or as received by the control system 26 from an outside source to be less than a threshold humidity level, e.g. less than 95%, less than 90%, or less than 85% relative humidity. An entry condition may be a baseline humidity (H1) as measured by the sensor 70 being less than a predetermined humidity value, e.g. less than 95%, less than 90%, or less than 85% relative humidity. An entry condition may be based on a comparison of H1 to a baseline humidity measured in a prior vehicle drive cycle. An entry condition may be the elapse of a predetermined time period since pump 160 activation, therefore indicating that a predetermined time period has elapsed since the diagnostic was last completed. An entry condition may be the humidity as measured by the sensor 70 remaining unchanged for a predetermined time period following engine start, e.g. during a time period with expected transient conditions. An entry condition may include a difference between the humidity as measured by the sensor 70 and an outside humidity (H0) as received by the control system from a source outside the vehicle being greater than a threshold, for example, an outside humidity (H0) as provided by a V2V communication, a V2X communication, satellite signals, weather reports, and the like.

At step 162, the control system 26 determines if the engine 16 is inoperative. For a conventional vehicle, the control system 26 may determine that the engine 16 is inoperative based on the end of a key cycle. The control system 26 may wait a predetermined time period after the key cycle before proceeding with the method 150, e.g., ten minutes, or may proceed from step 162 at an initiation of a key cycle and before the engine 16 is fueled. For a start-stop vehicle, the control system 26 may determine that the engine 16 is inoperative based on the key cycle as described above, or may additionally determine that the engine 16 is inoperative when it is "stopped", for example, at a red light or when the vehicle is standing and the control system 26 has deactivated the engine 16. For a hybrid vehicle, the control system 26 may determine that the engine 16 is inoperative based on the key cycle as described above, or during electric-only operation of the vehicle.

At step 164, the control system 26 motors the engine 16. The control system 26 is configured to crank the engine 16 without delivering fuel to the engine to draw intake air through the air intake 58 prior to step 166. The control system 26 controls the starting motor 56 or other electric machine connected to the crankshaft 54 of the engine 16 to rotate the crankshaft and cause the piston 52 to move within the cylinder 50. By motoring the engine, the control system 26 draws outside air through the intake 58 without fueling the engine 16 such that there is no combustion process or power output from the engine 16. In other examples, the control system 26 implements the method 150 by proceeding from step 162 directly to step 166 without motoring the engine.

At step 166, the control system measures a baseline humidity (H1). The baseline humidity (H1) may be measured as a single measurement, or may be taken as an average of humidity measurements over a time period.

At step 168, the control system 26 activates the misting system 100. The control system 26 controls the pump 110 and metering valve 114 to deliver a mist or otherwise atomized fluid from the reservoir 102 through the nozzle 112 and into the intake 58. The control system 26 may operate the system 100 to deliver a predetermined quantity of fluid as a mist into the intake 58. In further examples, the control system 26 may determine the predetermined quantity of fluid to be delivered as a function of the baseline humidity (H1) such that the amount of fluid delivered increases with increasing H1. The control system 26 may also operate the system 100 such that the mist is delivered over a predetermined time period.

At step 170, the control system 26 measures a post-mist humidity (H2). The control system 26 may measure the post-mist humidity (H2) within or at a predetermined time period after the misting process to allow sufficient time for the mist to disperse in the inlet 58 and for the humidity to rise. The control system 26 may take a single humidity measurement from the sensor 70, or may take a series of measurements and set the post-mist humidity (H2) as an average humidity, median humidity, or other value based on the measurements. In other examples, the control system 26 may monitor the signal from the humidity sensor 70 during and immediately following the misting step.

At step 172, the control system 26 compares the post-mist humidity (H2) to the baseline humidity H1. In one example, the control system 26 determines a difference between H2 and H1, and sets a flag counter at step 174 if the difference is less than a predetermined value, or proceeds to step 176 if the difference is greater than the predetermined value. In one example, the predetermined value or humidity difference is set as 5%, 10%, or 15% relative humidity, or a similar value.

In another example, the control system 26 compares the post-mist humidity to the baseline humidity as a ratio of H2/H1, and sets a flag counter is the ratio is less than a threshold value, e.g. greater than 1.05, 1.10, or another value. In a further example, the control system 26 compares a rate of change of the humidity with time, and compares this rate to a predetermined rate to determine whether to set a counter at 174, e.g. sets a counter if the rate of change is less than a predetermined rate. The control system 26 may use a fixed predetermined value or rate for use at step 172, or may use a predetermined value that is a function of temperature, baseline humidity, and/or an amount of water to be dispersed, for example, using a calibration table.

At step 176, the control system 26 resets the time period and returns to block 152, as the change in the humidity as sensed by the sensor 70 indicates that the sensor 70 is functioning as expected. Additionally, at step 176, the control system 76 may generate a diagnostic flag indicating rationality of the sensor in response to the change in humidity measured by the sensor being greater than the threshold value.

From step 174, the control system 26 proceeds to step 178, where it compares the number of flags as determined at step 174 to a predetermined value, e.g. 3, 4, 5 or another number. If the number of flags from step 174 is not greater than the predetermined value at 178, the control system 26 returns to block 152. If the number of flags from step 174 is greater than the predetermined value at 178, the control system 26 proceeds to block 180 and sets a diagnostic code. The diagnostic code is set at step 180 to Therefore, the control system 26 implements method 150 to generate a diagnostic code in response to a change in humidity measured by the sensor 70 being less than a threshold value, e.g. in response to a difference between H2 and H1 being less than the threshold value.

Figure 4:
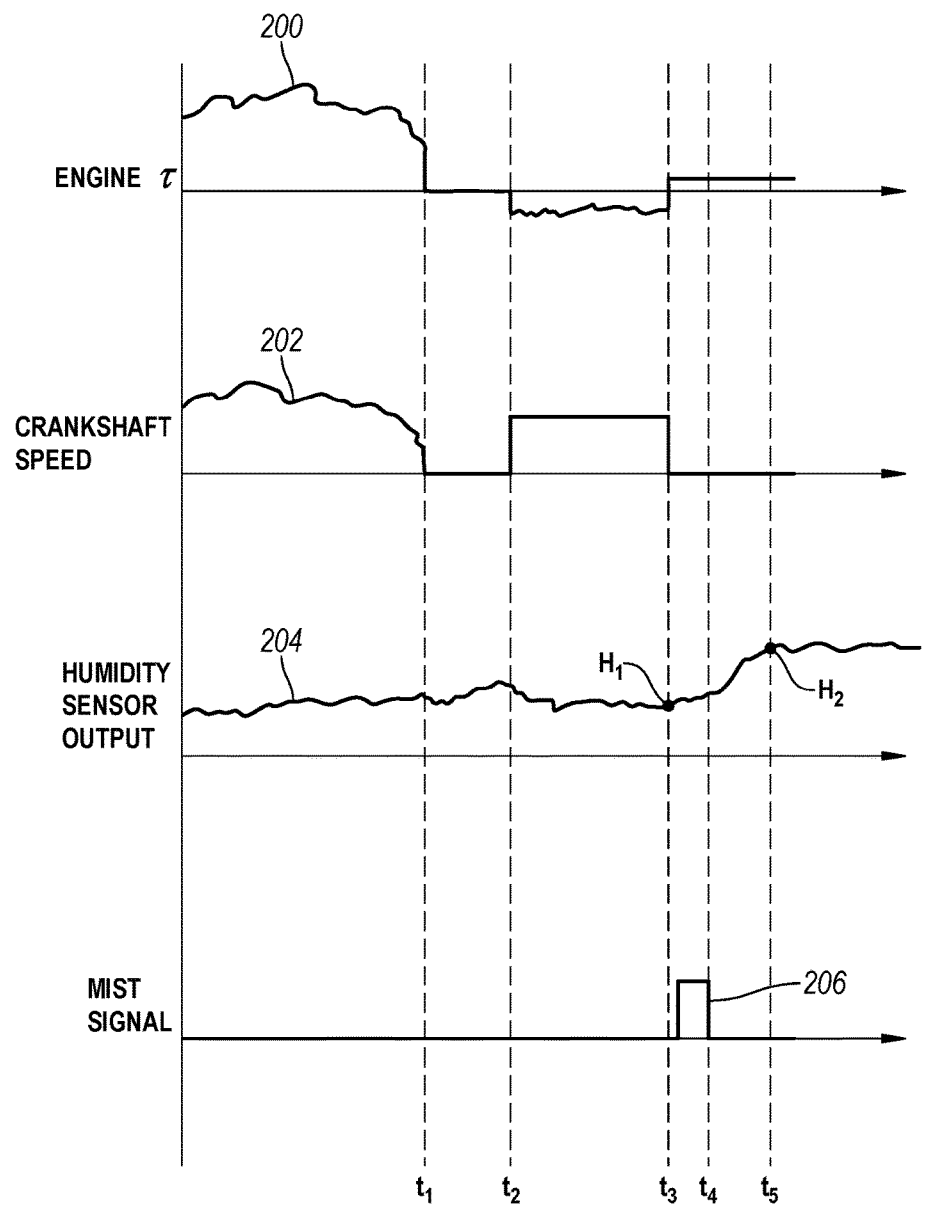
FIG. 4 illustrates a signal diagram for the method of FIG. 3 as implemented in the vehicle of FIG. 1.

FIG. 4 illustrates a signal diagram for the control system 26 implementing the method 150 in a vehicle 10 according to an example. Line 200 illustrates an engine 16 torque output signal. Line 202 illustrates a crankshaft speed of the engine 16. Line 204 illustrates a signal output of the humidity sensor 204. Line 206 illustrates a command signal for the misting system 100.

The vehicle 10 and engine 16 are operating before time t1. At time t1, the engine 16 is inoperative, e.g. at the end of a vehicle drive or key cycle. The entry conditions for the method 150 are met, such that at time t2, the control system 26 runs a purge cycle, as shown by the crankshaft 54 speed, and negative engine torque output between time t2 and t3. At the end of the purge cycle, or shortly thereafter, the control system 26 measures the humidity H1 from the sensor 70 as a baseline humidity, and subsequently command the misting system 100 to mist the intake 58 such that the humidity level in the intake adjacent to the sensor 70 is increased. The misting command ends at time t4, and as can be seen, the humidity as measured by the sensor 70 increases. At time t5, the control system 26 measures the humidity H2 as the post-mist humidity, and then proceeds to compare H1 and H2 to determine whether to set a flag or code. In the present example, the humidity is shown as increasing from H1 to H2 as a result of the misting process, such that the sensor 70 is functioning as expected. In other examples, H2 would be the same as or substantially similar to H1, such that the control system 26 would set a code or flag as described above with respect to FIG. 3.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   an air intake for an engine having a humidity sensor;
   a system having a reservoir fluidly connected to a nozzle positioned in the air intake; and
   a controller configured to activate the system to deliver fluid from the nozzle into the intake for evaporation therein while the engine is inoperative and generate a diagnostic code in response to a change in humidity measured by the sensor being less than a threshold value.

2. The vehicle of claim 1 further comprising a heat exchanger having a drain for condensed water, the drain fluidly connected to an inlet of the reservoir, the heat exchanger being one of an air-conditioning evaporator, a charge air cooler, and an exhaust gas recirculation cooler.

3. The vehicle of claim 1 wherein the air intake includes an exhaust gas recirculation (EGR) loop, wherein the humidity sensor is positioned within the EGR loop.

4. The vehicle of claim 1 wherein the air intake has a throttle, the humidity sensor positioned downstream of the throttle.

5. The vehicle of claim 1 wherein the controller is configured to measure a baseline humidity (H1) prior to activating the system, and measure a post-atomizing humidity (H2) within a predetermined time period following activating the system; and wherein the controller is further configured to generate the diagnostic code in response to the change in humidity being a difference between H2 and H1, the difference being less than the threshold value.

6. The vehicle of claim 5 wherein the controller is configured to crank the engine without delivering fuel thereto to draw outside air through the air intake prior to measuring H1.

7. The vehicle of claim 1 wherein the controller is further configured to activate the system to deliver fluid from the nozzle into the intake while the engine is inoperative and in response to a humidity measured by the humidity sensor being below a threshold humidity.

8. The vehicle of claim 1 wherein the reservoir has a fluid level sensor; and wherein the controller is configured to receive a signal indicative of an amount of fluid in the reservoir from the fluid level sensor, and activate the system to deliver fluid from the nozzle into the intake while the engine is inoperative in response to the amount of fluid being above a threshold value.

9. The vehicle of claim 1 wherein the reservoir has a drain valve fluidly connecting the reservoir to an outside environment.

10. The vehicle of claim 9 wherein the controller is configured to open the drain valve to empty the reservoir in response to receiving a signal indicative of an outside air temperature being below a threshold.

11. The vehicle of claim 9 wherein the reservoir has a fluid level sensor; and wherein, during operation of the vehicle, the controller is configured to (i) open the drain valve in response to a signal indicative of an amount of fluid in the reservoir from the fluid level sensor being above a first threshold (ii) and close the drain valve in response to the signal being below a second threshold, the second threshold being less than the first threshold.

12. The vehicle of claim 1 wherein the system comprises one of a diesel exhaust fluid system containing the reservoir and a windshield washing system containing the reservoir.

13. The vehicle of claim 1 wherein the controller is configured to generate a diagnostic flag indicating rationality of the sensor in response to the change in humidity measured by the sensor being greater than the threshold value.

14. The vehicle of claim 1 wherein the nozzle is configured to disperse fluid from the reservoir from bulk liquid form into droplet form, a mean diameter of droplets provided into the reservoir being less than 100 micrometers.

15. The vehicle of claim 1 wherein the controller is further configured to activate the system while the engine is inoperative and within a predetermined time period after a vehicle drive cycle.

* * * * *